United States Patent
Schmitz et al.

(10) Patent No.: US 9,100,208 B2
(45) Date of Patent: Aug. 4, 2015

(54) METHOD AND APPARATUS FOR CIRCUIT EMULATION WITH INTEGRATED NETWORK DIAGNOSTICS AND REDUCED FORM FACTOR IN LARGE PUBLIC COMMUNICATION NETWORKS

(75) Inventors: Peter Bradley Schmitz, Fairfax Station, VA (US); David Owen Corp, Clifton, VA (US); Natalie C. Ramsay, Herndon, VA (US)

(73) Assignee: HUBBELL INCORPORATED, Shelton, CT (US)

( * ) Notice: Subject to any disclaimer, the term of this patent is extended or adjusted under 35 U.S.C. 154(b) by 951 days.

(21) Appl. No.: 13/283,069

(22) Filed: Oct. 27, 2011

(65) Prior Publication Data
US 2013/0077499 A1 Mar. 28, 2013

Related U.S. Application Data

(60) Provisional application No. 61/539,730, filed on Sep. 27, 2011.

(51) Int. Cl.
*H04L 12/40* (2006.01)
*H04J 3/04* (2006.01)
*H04J 3/06* (2006.01)

(52) U.S. Cl.
CPC .... *H04L 12/40006* (2013.01); *H04L 12/40032* (2013.01); *H04J 3/04* (2013.01); *H04J 3/0638* (2013.01); *H04J 3/0688* (2013.01)

(58) Field of Classification Search
USPC ............... 370/229–249, 254–351, 400–466; 709/229–236
See application file for complete search history.

(56) References Cited

U.S. PATENT DOCUMENTS

| | | | |
|---|---|---|---|
| 4,821,150 A | 4/1989 | Duthie et al. | |
| 5,101,320 A | 3/1992 | Bhargava et al. | |
| 6,009,081 A * | 12/1999 | Wheeler et al. | 370/255 |
| 6,078,504 A | 6/2000 | Miles | |
| 6,175,508 B1 | 1/2001 | McMillian et al. | |
| 6,529,569 B1 | 3/2003 | Corp et al. | |
| 6,539,023 B1 | 3/2003 | Bartholomay et al. | |
| 6,539,486 B1 | 3/2003 | Rolls et al. | |
| 6,643,269 B1 * | 11/2003 | Fan et al. | 370/254 |
| 6,958,908 B2 | 10/2005 | Lipski et al. | |
| 7,054,310 B1 * | 5/2006 | Shivji et al. | 370/366 |
| 7,206,283 B2 * | 4/2007 | Chang et al. | 370/230 |
| 7,252,439 B2 | 8/2007 | Takeuchi et al. | |

(Continued)

OTHER PUBLICATIONS

T1 NIU, Total Access™, T1 Network Interface Unit, © ADTRAN, Inc., Sep. 2000, 2 pages.

(Continued)

*Primary Examiner* — Man Phan
(74) *Attorney, Agent, or Firm* — Roylance, Abrams, Berdo & Goodman, L.L.P.

(57) ABSTRACT

An multiservice access device (MAD) for Ethernet and DS1/DS3 services is provided for public communications carriers (telcos), for example, and has a reduced form factor (e.g., Type 400 NCTE mechanics or small enclosure), at least two 2.5 Gb/1 Gb facility side ports, at least four full rate GigE drops, complementary RJ48C demarcation and stub-ended DS1 cable options, integral T1 NIUs for in-band loopback, NPRM, SPRM, AIS/AIS-CI and RAI/RAI-CI diagnostics, lightning protection, and protection switching. The MAD has built-in SynchE and IEEE 1588 synchronization, and Stratum 3 and incoming DS1/DS3 synchronization capabilities.

21 Claims, 12 Drawing Sheets

(56) References Cited

U.S. PATENT DOCUMENTS

| | | | |
|---|---|---|---|
| 7,289,538 B1* | 10/2007 | Paradise et al. | 370/497 |
| 7,304,958 B2 | 12/2007 | Nelson et al. | |
| 7,315,251 B1 | 1/2008 | Holland et al. | |
| 7,327,563 B2 | 2/2008 | Cauthron | |
| 7,353,288 B1* | 4/2008 | Rangavajjhala et al. | 709/236 |
| 7,379,481 B2 | 5/2008 | Lipski et al. | |
| 7,417,848 B2 | 8/2008 | Bergmann et al. | |
| 7,468,891 B2 | 12/2008 | Lipski et al. | |
| 7,620,171 B2 | 11/2009 | Sclater et al. | |
| 7,715,433 B2* | 5/2010 | Boren | 370/466 |
| 7,856,166 B2 | 12/2010 | Biribuze et al. | |
| 7,911,785 B2 | 3/2011 | Coglitore et al. | |
| 8,009,435 B2 | 8/2011 | Metzger | |
| 8,023,642 B2 | 9/2011 | Miller, III et al. | |
| 8,027,337 B2 | 9/2011 | Lipski et al. | |
| 8,194,704 B2* | 6/2012 | Hamasaki | 370/503 |
| 2004/0240882 A1 | 12/2004 | Lipski et al. | |
| 2008/0201515 A1 | 8/2008 | Birgin et al. | |
| 2008/0279567 A1* | 11/2008 | Huang et al. | 398/168 |
| 2009/0245258 A1 | 10/2009 | Tanaka et al. | |
| 2010/0091676 A1 | 4/2010 | Moran et al. | |
| 2011/0002690 A1 | 1/2011 | Anschutz | |
| 2011/0142111 A1 | 6/2011 | Sands et al. | |
| 2011/0188514 A1 | 8/2011 | Schmitz et al. | |
| 2011/0242720 A1 | 10/2011 | Annis et al. | |
| 2012/0026868 A1* | 2/2012 | Chang et al. | 370/230 |

OTHER PUBLICATIONS

ANSI T1.403-1999, Annex D, AIS-CI and RAI-CI, Published by American National Standards Institute, Inc., New York, NY, Copyright © 1999 by Alliance for Telecommunications Industry Solutions, 3 pages (incl. pp. i,46,47).

* cited by examiner

METHOD AND APPARATUS FOR CIRCUIT EMULATION WITH INTEGRATED NETWORK DIAGNOSTICS AND REDUCED FORM FACTOR IN LARGE PUBLIC COMMUNICATION NETWORKS

This application claims the benefit of U.S. provisional application Ser. No. 61/539,730, filed Sep. 27, 2011, the entire contents of which are incorporated herein by reference.

BACKGROUND OF THE INVENTION

1. Field of the Invention

The present invention relates generally to a multiservice access device for large public communication networks, and to a method and apparatus for providing circuit emulation with integrated network diagnostics and reduced form factor (e.g., an Ethernet access device with TDM service, alarms and diagnostics) for large public communication network equipment.

2. Description of Related Art

Large public communication carriers (hereinafter "telcos") desiring to sell a service, such as a DS1 or DS3, generally must do so with certain performance assurances to their customers. For example, if a circuit fails or if there are too many errors within the delivered DS1 or DS3, telco customers may be eligible for a partial refund of fees paid based upon the length or severity of failure. By contrast, such performance assurances are generally not required of large and small private networks providing DS1 and/or DS3 over an Ethernet network. In addition to service assurances, telcos must be able to provide services in a cost-effective manner. A need therefore exists for improved large public communication network equipment that provides services such as DS1 and/or DS3.

SUMMARY OF THE INVENTION

Illustrative embodiments of the present invention provide a multiservice access device (MAD) and method to integrate network diagnostics (e.g., similar to diagnostics used by public communications carriers or telcos for TDM circuits) into a simple self-contained printed circuit board designed to match the same telco shelf standards used for subscriber-located DS1 installations to significantly reduce the complexity and cost of providing DS1 and/or DS3 services over Ethernet. The integrated diagnostics can apply to other mounting configurations as well.

Further, illustrative embodiments of the present invention, the multiservice access device (MAD) incorporates in-band loopbacks, Network Performance Report Messages (NPRM), Supplemental Network Performance Report Messages (SNPRM), Alarm Indication Signal (AIS) and Remote Alarm Indication (RAI), Alarm Indication Signal-Customer Interface (AIS-CI) and Remote Alarm Indication-Customer Interface (RAI-CI) for one or more DS1 and/or DS3 circuits within an FPGA, for example, for use with a circuit emulation chip and an Ethernet switch to provide a multiservice access device. The MAD also comprises integrated Network interface Units (NIUs) and lightning protection. Thus, the MAD is miniaturized so that it can fit on the referenced standard mechanics of telcos, while other similar versions of the multiservice access device are optimized for use in relatively small outdoor boxes for deployment on exterior telco-customer building walls, in accordance with different illustrative embodiments of the present invention.

In accordance with illustrative embodiments of the present invention, the MAD has configurable synchronization options to minimize delay, jitter and synchronization differences that can occur when transporting DS1 and/or DS3 signals over an Ethernet network. The configurable synchronization options can be, for example, SynchE, IEEE 1588 synchronization, synchronization to incoming DS1 or DS3 signals, Stratum 3 synchronization, and Adaptive Clock Recovery.

BRIEF DESCRIPTION OF THE DRAWINGS

The invention will be more readily understood with reference to the illustrative embodiments thereof illustrated in the attached drawing figures, in which.

Throughout the drawing figures, like reference numbers will be understood to refer to like elements, features and structures.

DETAILED DESCRIPTION OF ILLUSTRATIVE EMBODIMENTS

Figure 1:
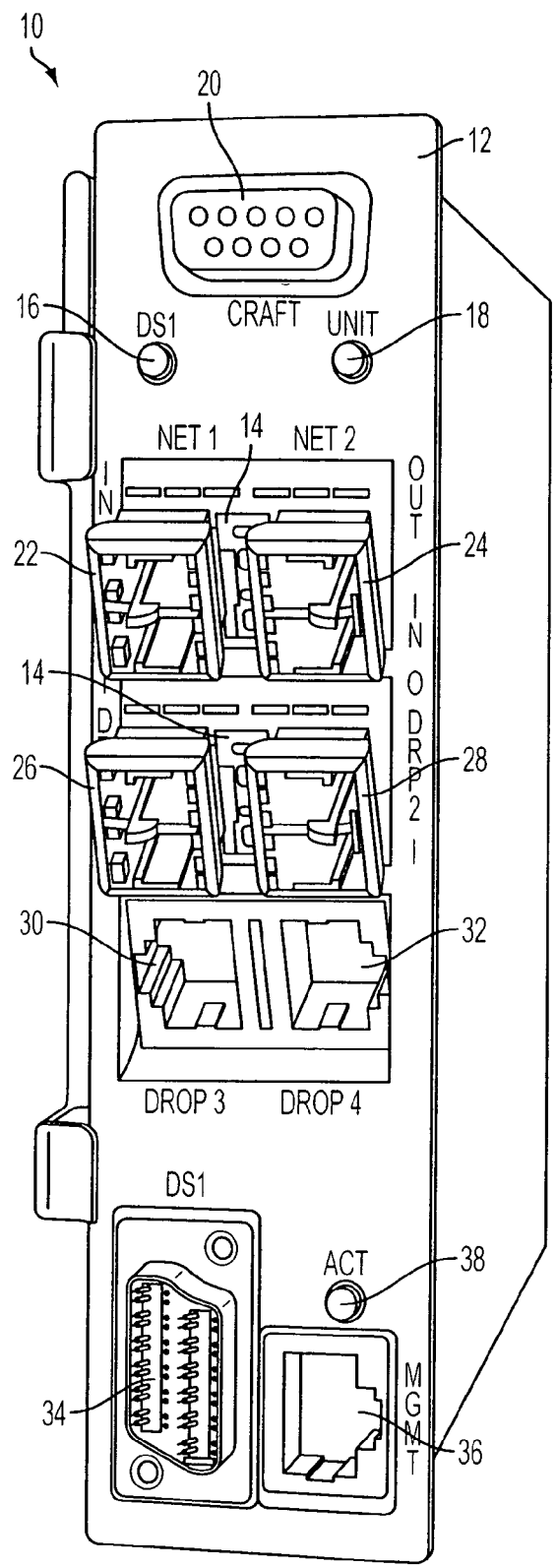
FIG. 1 depicts a multiservice access device configured to plug-in to existing cell site and business mountings in accordance with an illustrative embodiment of the present invention.

In accordance with an illustrative embodiment of the present invention, a multiservice access device (MAD) 700 is implemented as an all-in-one Ethernet and DS1 access card 10, as shown in FIG. 1. The card 10 has a reduced form factor (e.g., for shelf slot plug-in capability) that provides access to both Ethernet and DS1 ports via its front panel 12. For example, the card has Industry Standard T1 NIU or Type 400 network channel terminating equipment (NCTE) or Smart Jack mechanics. Thus, the card-based, T1 sizing of the multiservice access device allows it to plug into thousands of existing cell site and business mountings and realize advantages such as placement at subscriber sites with limited space. Although the multiservice access device or MAD 700 is miniaturized (e.g., as a card 1W so that it can fit on the referenced standard mechanics of telcos, other similar versions of the multiservice access device can be optimized for use in relatively small outdoor boxes for deployment on exterior telco-customer building walls in accordance with different illustrative embodiments of the present invention As described below (e.g., in connection with FIGS. 7 and 8), the MAD 700 has built-in Layer 2 OAM and synchronization capabilities, as well as twelve full-featured T1 NIUs with GR-1089-CORE Issue 6 lightning protection and AIS-CI, RAI-CI, NPRM and SPRM diagnostics built into a card 10 or other reduced form factor MAD. Thus, the MAD 700 is particularly useful in large public communication networks where other Ethernet access devices are inadequate. For example, Circuit Emulation Service (CES) equipment is generally supplied in a "pizza box" style rack mounted chassis. Although this equipment usually has extensive Ethernet diagnostic capabilities, it lacks some or most of the diagnostics used by telcos to maintain traditional time division multiplexing (TDM) DS1 and DS3 circuits. Telcos often install additional equipment called Network Interface Units (NIUs) to provide these diagnostics rather than invest in a totally different means of centralized network management (that is, use of Ethernet diagnostics for DS1 and DS3 circuits) to maintain their network. The external NIUs add cost and, worse, installation complexity. Such installations generally comprise a relay rack, power system, wiring and shelves and network demarcation points, and therefore are in contrast with installations in accordance with illustrative embodiments of the present invention that employ, for example, DS1 equipment placed at a subscriber site comprising a self-contained printed circuit board designed to match telco shelf standards for installation in mountings or boxes with integral demarcation jacks.

Use of Ethernet rather than traditional time division multiplexing (TDM) is one way telcos can minimize the cost of carrying data from one location to another. There are two other important ways to reduce the cost of providing service. One way is to minimize the cost of the equipment installation at a subscriber site. Another way is to minimize the number of "truck rolls" necessary to maintain a circuit and diagnose service problems. As described herein, illustrative embodiments of the invention advantageously reduce installation and truck-roll costs via (1) the convenient plug-in operation or installation of the card 10 or other reduced form factor MAD 700, and (2) integral NIU provide diagnostics within the self-contained card or other reduced form factor MAD which includes, but are not limited to, in-band loop backs, Network Performance Report Messages (NPRM), Supplemental Performance Report Messages (SPRM), Alarm Indication Signal (AIS), Remote Alarm indication (RAI), Alarm Indication Signal-Customer Interface (AIS-CI) and Remote Alarm Indication-Customer Interface (RAI-CI). For example, the provision of AIS-CI and RAI-CI significantly reduces, if not prevents, "truck rolls" (i.e., deployment of fleet vehicles or trucks for repairs). In addition, the diagnostics further refine information received when an alarm signal is received by indicating, for example, an alarm signal occurred because a subscriber unplugged the cable, in which case no repair truck deployment is needed, or an error has occurred in a system component, in which case a repair (e.g., "truck roll") may be needed.

While telcos increasingly rely more on Ethernet than T1s for data service, telcos continue to support T1s for 911 services and legacy systems. The MAD 700 constructed in accordance with illustrative embodiments of the present invention provides Ethernet and T1/DS1 access, but unlike other access devices, the MAD 700 employs the referenced standard mechanics of telcos for compact and convenient installation, as well as diagnostics on the T1 services that other Ethernet and DS1/T1 access devices fail to provide without reliance upon external devices.

Providing fiber to cell towers for Ethernet service has become more practical than copper lines and often necessary to support higher Ethernet speeds. Cell tower equipment, however, needs lightning protection since significant voltages occur between site equipment when lightning strikes. Ethernet access devices generally do not have integral means to prevent service failure due to lightning strikes. As described below, the MAD 700 constructed in accordance with illustrative embodiments of the present invention also provides built-in lightning protection (e.g., GR-1089-CORE Issue 6 DS1 Class 3a/b and 5a/b lightning protection).

The MAD 700 constructed in accordance with illustrative embodiments of the present invention employs SynchE, IEEE 1588 and Stratum 3 synchronization. The MAD 700 avoids 1588/SynchE coupling issues found in some other products that can generate wander and prevent use in 4G networks. Timing for proper synchronization is critical to providing "Carrier Grade" DS1 and DS3 service. The MAD 700 provides DS1 and DS3 diagnostics and timing to support such Carrier Grade services.

With continued reference to FIG. 1, the MAD 700 (e.g., card 10) comprises at least two optical facility-side Ethernet ports 22 and 24 (e.g., small form pluggable or SFP ports labeled "NET1" and "NET2" on the front plate 12), each capable of adapting to 2.5 Gigabit per second (Gb) or 1 Gb operation (e.g., single fiber, dual fiber and/or conventional or course wave division multiplexing (CWDM)). The MAD 700 also comprises four Full Rate Gigabit Ethernet (GigE) drops, that is, two optical drops 26 and 28 (e.g., labeled "DROP1" and "DROP2" on the face plate 12) and two electrical drops 30 and 32 (e.g., labeled "DROP3" and "DROP4" on the face plate 12), as well as a DS1 connector 34 for supporting twelve DS1 drops. For example, the DS1 connector has twelve 4-wire DS1 interfaces, with each interface comprising a standard transmit pair and receive pair. Thus, MAD 700 manages more than 8 Gb of bandwidth through a 14 Gb wirespeed switching core, described below, to support non-blocking services, as well as robust micro-ring and daisy-chain topologies, as described below in connection with FIGS. 5 and 6, respectively. By managing up to 8 Gb of bandwidth, the MAD 700 (e.g., the simple all-in-one Ethernet and DS1 access card 10 shown in FIG. 1) supports multiple generations of cell site backhaul and evolving business service requirements.

Figure 11:
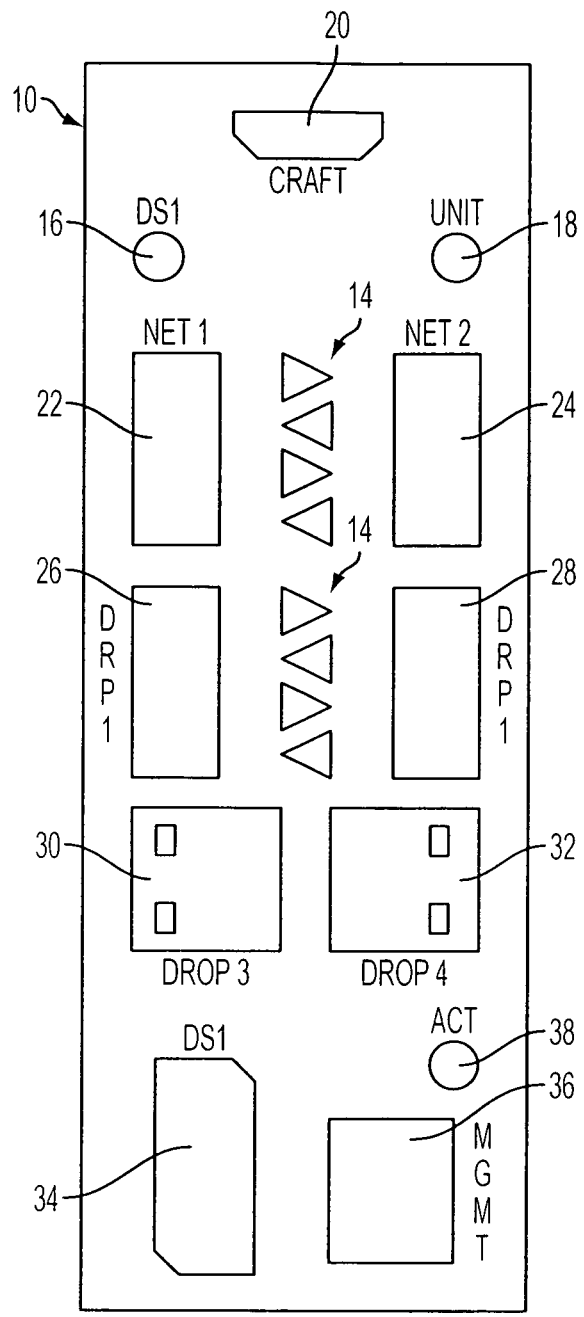
FIG. 11 is a front view of a face plate of a multiservice access device in accordance with an illustrative embodiment of the present invention.

With continued reference to FIGS. 1 and 11, LEDs or other indicators 14, 16 and 18 corresponding to connectors 2, 24, 26 and 28 are provided for indicating conditions with respect to the card or unit 10 itself, a DS1 and/or an Ethernet link connected thereto (e.g., see front-panel LEDs for Ethernet, DS1 and UNIT for a quick view of over-all operational status). The ACT LED 38 indicates activity on the Management port (MGMT, 38) when the MGMT port is connected to a computer to provision the unit. LEDs can be multi-color, using red, green or yellow using different annunciation periods to indicate different operating states, thereby simplifying operation and reducing the size of the MAD 700.

As shown in FIG. 1, the front panel 12 of a card or other reduced form factor MAD 700 has a DB-9, RS232 female port 20 for access via a personal computer (PC), laptop or other computing device, for example, that is running Hyper-Terminal or other VT-100 emulation program, to provide secure provisioning of DS1 parameters. This asynchronous serial port operates at 9600 baud with 8 bits of data, no parity, no flow control, and 1 stop bit, for example. A standard RJ45 Out of Band management port 36 provides secure provisioning of Ethernet parameters.

The SFP Ethernet ports 22 and 24 (e.g., NET1 and NET2) each accommodate a multi-rate Ethernet SFP to operate at either a 1 Gb or 2.5 Gb Ethernet rate. NET1, for example, can provide an interface to the network-side facility. NET2 can provide an interface to the network-side facility in switch-to-protect configurations or an extension to another card 10 micro-ring or daisy-chain applications described below with reference to FIGS. 5 and 6.

Similarly, the DROP1 and DROP2 can be SFP Ethernet ports 28 and 30, respectively, and each accommodate a 1 Gb Ethernet SFP so that DROP1 and DROP2 can each operate at a rate of up to 1 Gb, for example. DROP1 and DROP2 can each provide an interface to an optical subscriber demarcation jack or, in bookend configurations (e.g., FIG. 2), to a network switch or router.

The DROP3 and DROP4 ports 30 and 32 can each be an RJ45 10/100/1000BaseT Ethernet port. DROP3 and DROP4 can each operate at a rate of up to 1 Gb and provide an interface to an electrical subscriber demarcation jack or, in bookend configurations (FIG. 2), to a network switch or router.

Figure 2:
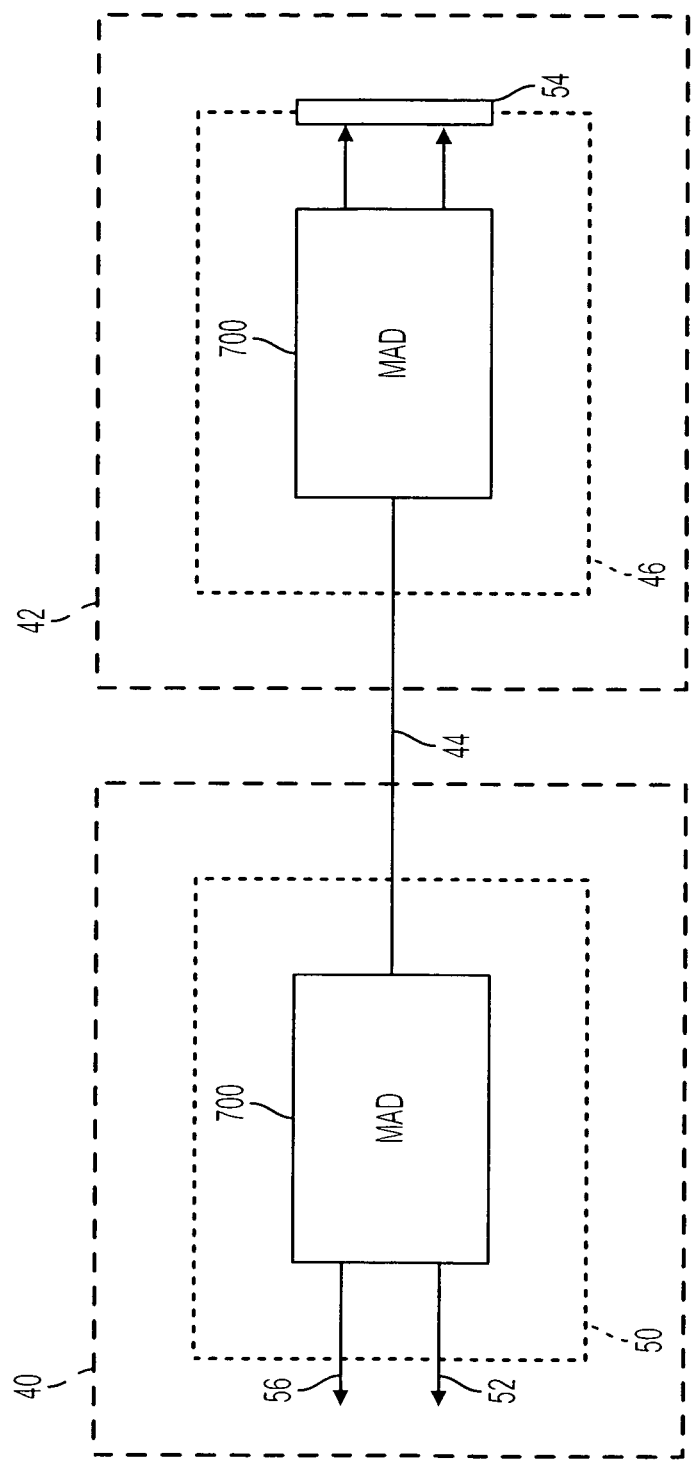
FIGS. 2, 3, 4, 5 and 6 are block diagrams depicting respective configurations using multiservice access devices in accordance with illustrative embodiments of the present invention.

As shown in FIG. 2, two multiservice access devices (e.g., both are cards 10) are installed in an illustrative bookend configuration at respective sites 40 and 42 such that the bandwidth of the link 44 between them is 1 Gb to 5 Gb, depending on the 1310, 1550, CWDM or single fiber SFPs employed in the ports 22 and/or 24 of the respective cards 10. The site 40 can be, for example, a remote terminal (RT), controlled environmental vault (CEV), hut, building telephone room or central office (CO), and so on. The site 42 can be, for example, a cell tower or cell site suite, a closet or other enclosure on a building rooftop or other customer premise, or a Westell CellPak CP258 equipped with a CSSI kit (available from Pulse Communications Inc., Herndon, Va.), among other customer accessible demarcation points 54.

With continued reference to FIG. 2, various interfaces can be connected to the ports 26, 28, 30, 32 and 34 (e.g., DROP1, DROP2, DROP3 and DROP4, and DS1 on the face plate 12) of the respective MADs 700 deployed at the sites 40 and 42. As explained above, the DS1 connector 34 has twelve DS1 interfaces. When a MAD 700 constructed in accordance with an illustrative embodiment of the present invention (e.g., card 10) is deployed in a mounting 46 at a site 42 such as a 3O3D3-CPL2C multi-slot TDM/IP mounting available from Pulse Communications Inc., Herndon, Va., for example, a cable 48 (e.g., a CPM-SG-12DS1X available from Pulse Communications Inc.) can be used that provides 12 RJ48C bulkhead jacks for 12 DS1 demarcation points indicated generally at 54. LC and/or RJ45 Ethernet demarcation points are also available.

As shown in FIG. 2, a MAD 700 constructed in accordance with an illustrative embodiment of the present invention (e.g., card 10) at a site 42 can be deployed in a mounting 50 such as a shelf (e.g., 2O3D3-19A two-slot TDM/IP mounting available from Pulse Communications Inc., Herndon, Va.), and a cable 52 (e.g., MRJ-MSL/U50Sxxx available from Pulse Communications Inc. where "xxx" in the part number represents the cable length in feet) provides a stub-ended cable with separate transmit and receive pairs. An adapter (e.g., a MRJ-MBL/TRANS adapter available from Pulse Communications Inc.) provides a female AMP connector interface with screw-lock strain relief hardware designed to interface existing male 50-pin AMP connector interfaces (e.g., AMP-MBL/U50Sxxx cables available from Pulse Communications Inc.). The MAD 700 (e.g., card 10) in mounting 50 can also provide 1-4 Gb of Ethernet bandwidth as indicated at 56.

Figure 3:
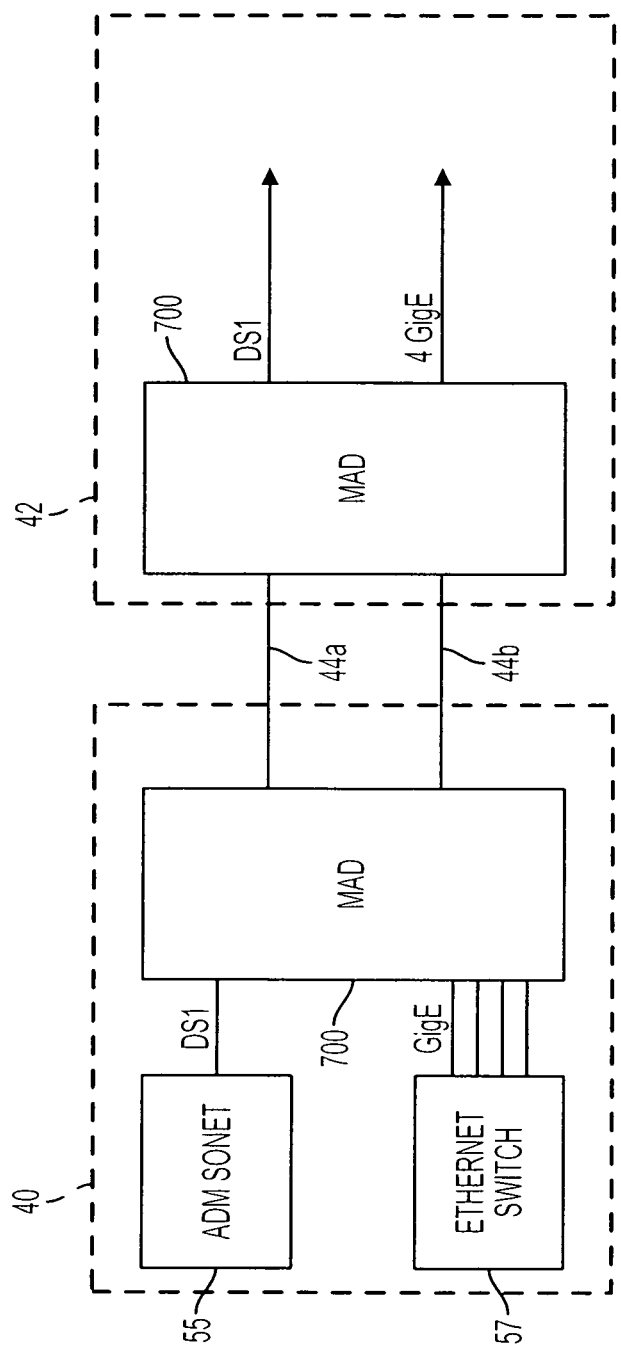

With reference to FIG. 3, sites 40 and 42 can each be configured with a MAD 700 (e.g., card 10) and links 44a and 44b to manage 8 Gb of bandwidth. The specific mounting is omitted from the figure. It is to be understood that the mounting can be selected from among a number of different types of mountings (e.g., different types of shelves, enclosures, and so on).

Figure 4:
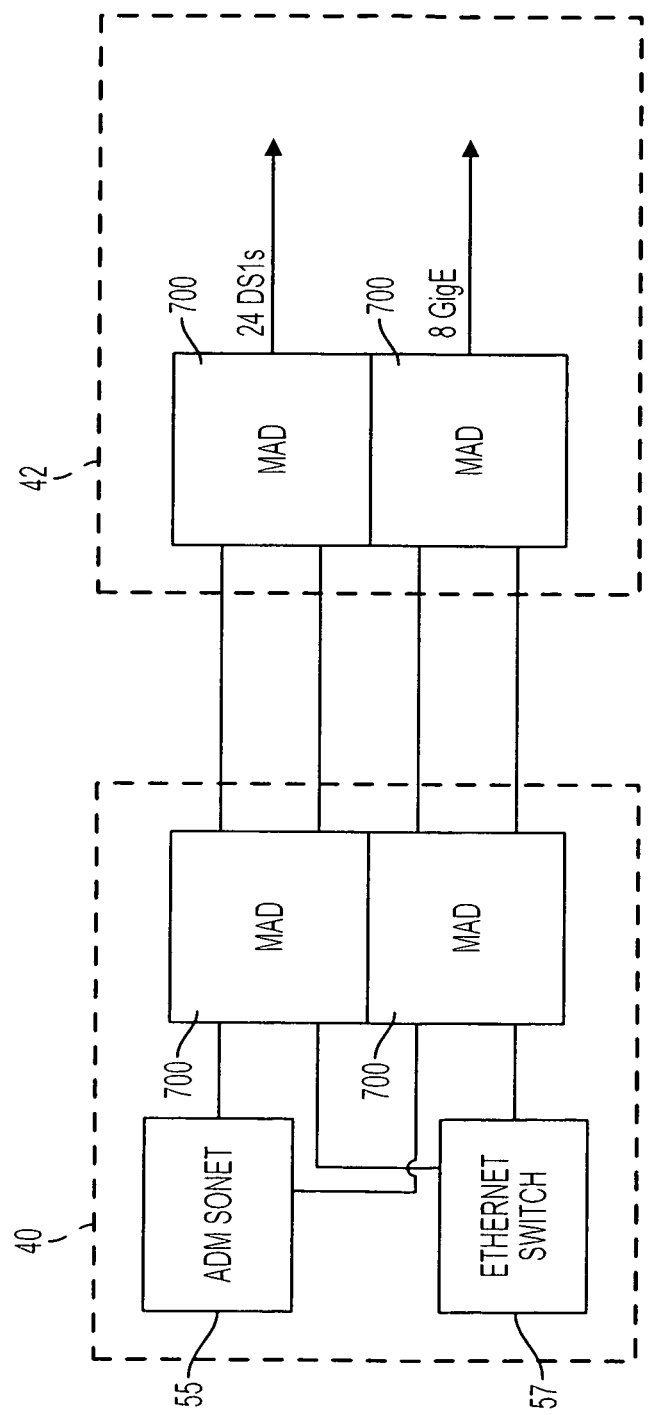
Figure 6:
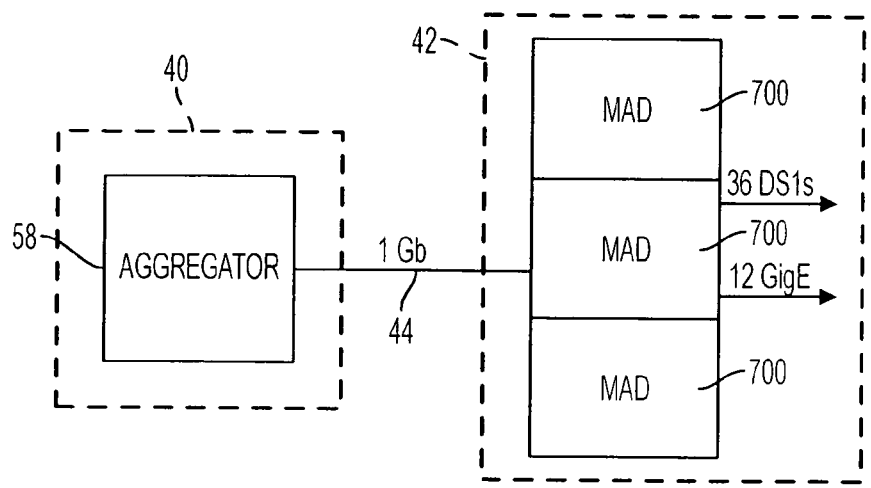

As shown in FIG. 4, a user can plug in a second card 10 to manage 16 Gb in a −40° C. to +70° C. wall mounting or one remote unit (RU) shelf. For example, a pair of MADs 700 (e.g., a pair of cards 10) can plug into an existing 19"/23" rack mounted 2O3D3-19A 1.75" (1U) high shelf, or a 3O3D3-CPL2C locking wall mounting, to provide 8 Full Rate GigE drops plus 24 DS1s at that site 40 or 42. Correspondingly, as shown in FIG. 6, the site 40 can have an aggregator 58. Adding a third card 10 at site 42 (e.g., using a daisy-chain topology, allows, for example, a 1 Gb input 44 to provide 12 GigE drop interfaces plus 36 DS1s at 42.

Figure 5:
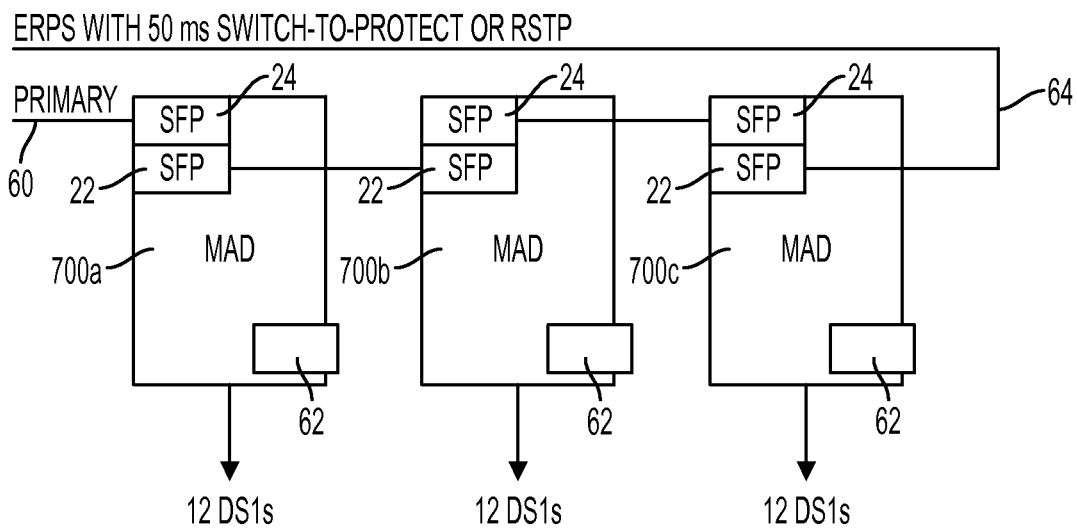

A MAD 700 constructed in accordance with an illustrative embodiment of the present invention (e.g., card 10) can be configured to implement micro-ring and daisy-chain topologies such that a single fiber 60, for example, can deliver dozens of DS1 ports and dozens of GigE ports (e.g., Ethernet drops such as two RJ45 and two SFP, as indicated generally at 62 in FIG. 5), and therefore facilitate expansion and resiliency, simple growth, and low first costs. With reference to FIGS. 5 and 6, switch-to-protect service is also provided by the MAD 700 in accordance with an illustrative embodiment of the present invention, which is a significant advantage over Ethernet access devices for private networks that do not provide micro-ring applications since telcos are interested in having protected Ethernet rings in much the same way telcos are interested in having protected SONET rings.

For example, if one of the paths in a MAD 700 failed (e.g., card 10b in FIG. 5), Ethernet traffic can be automatically sent to the network via another path 64. As shown in FIG. 5, a fiber 60 is provided to the network side port 22 (e.g., a SFP Ethernet port) on device 700a, which can manage Ethernet throughput (e.g., 2.5 Gb) to port 22 on device 700b. In the event that a network side path failed (e.g., in device 10b), an Ethernet switch on the device 700b (described below) can manage Ethernet throughput (e.g., 2.5 Gb) using the other path (e.g., via port 24) to the device 700c to provide a path 64 back to the network. The devices 700a, 700b and 700c use, for example, ERPS with 50 ms, switch-to-protect, or RSTP to implement redundant network pathways. Such switch-to-protect or redundant pathways operation of the MAD 700, in accordance with an embodiment of the present invention, represents a significant advantage over existing suites of vendor equipment deployed, for example, at a cell tower. Vendors' suites of equipment do not share equipment with other vendors. Thus, to avoid loss of service due to a network pathway being down, each suite of vendor equipment generally has its own path back to the network (e.g., via an external box or equipment), thereby adding to complexity and cost. The MAD 700 constructed in accordance with an illustrative embodiment of the present invention overcomes these disadvantages because it can be simply a card plug-in at each vendor's suite, thereby eliminating additional external equipment, and the Ethernet switch (described below) in the MAD manages throughput if a fiber is out. For example, the multiservice access devices deployed in several vendors' suites at a cell site can communicate with each other (e.g., using link aggregation control protocol (LACP)) to ensure continued service when a fiber fails. For example, LACP allows a network device such as a card 10 in one suite to negotiate an automatic bundling of links by sending LACP packets to a peer (e.g., a directly connected card 10 in another suite that also implements LACP).

Thus, as illustrated in FIGS. 2 through 6, the MAD 700 in accordance with illustrative embodiments of the present invention provides universal and integrated topologies to leverage existing SONET, DCS, Router and Aggregator infrastructure.

Figure 7:
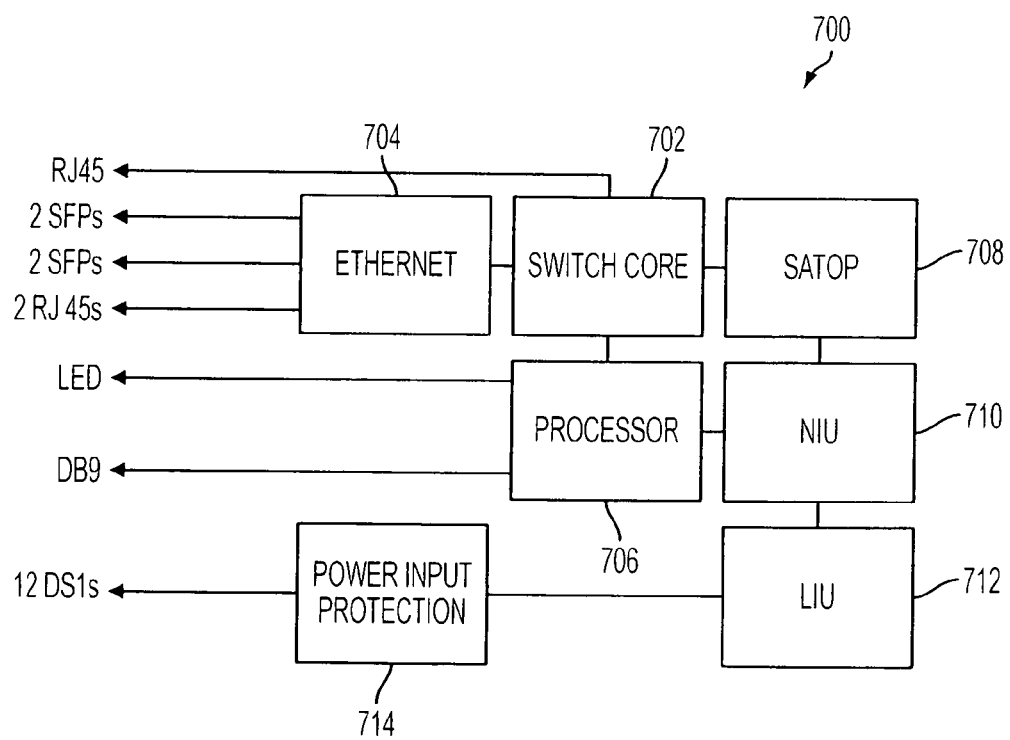
FIG. 7 is a block diagram of a multiservice access device in accordance with an illustrative embodiment of the present invention.

FIG. 7 illustrates a block diagram of the MAD 700 in accordance with an illustrative embodiment of the present invention. In the example of FIG. 7, a switch core 702 that performs the core switching functionality is coupled to an Ethernet PHY device 704, which provides a plurality of Small Form factor Plugs (SFP) for networking functionality. For example, the Ethernet device 704 interfaces with a pair of facility side SFPs (e.g., each SFP operating at 1 or 2.5 Gb), a pair of SFPs (e.g., each operating at 1 Gb), and a pair of RJ45s (e.g., each a 10/100/1000BT port). An RJ45 interface for managing the MAD 700 (e.g., for local out of band (OOB) management) is coupled to the switch core 702. The switch core 702 is also coupled to a processor 706 that controls the overall operations of the multiservice access switch 700. The switch core 702 is also coupled to a Structure Agnostic TDM over Packet (SAToP) device 708. The SAToP 708 receives synchronous traffic from a Network Interface Unit (NIU) 710 and converts all traffic to a packet format suitable for Ethernet transmission. For instance, SAToP 708 may receive TDM synsynchronous data from a DS1 or DS3, which must be converted into a packetized format suitable for asynchronous Ethernet transmission.

The NIU 710 is also coupled to the processor 706 and performs telecom diagnostics on the network. In the example of FIG. 7, the NIU 710 is integral to the MAD 700 and thereby provides telecom diagnostics (e.g., AIS-CI, RAI-CI, NPRM, SPRM, etc.) on a plurality of telecommunication network interfaces (DS1, DS3, etc.). A line input unit (LIU) 712 receives the physical network traffic and provides the received data to the NIU 710 for diagnostics and transmission to the SAToP 708.

In the example of FIG. 7, the LIU 712 is coupled to multiple DS1 interfaces (e.g., 12 interfaces as described in connection with FIG. 1) via power input protection device 714 to provide power protection to prevent service failure (e.g., a line surge or a lightning strike). For example, in a cellular application, an antenna of a base station may be struck by lightning due to its height, thereby causing a brief high voltage/high current surge in the system which may cause temporary or permanent failure of devices in the MAD 700. Accordingly, the power input protection device 714 is configured to handle suitable events that could cause temporary or permanent failure based on the type of installation.

Figure 8:
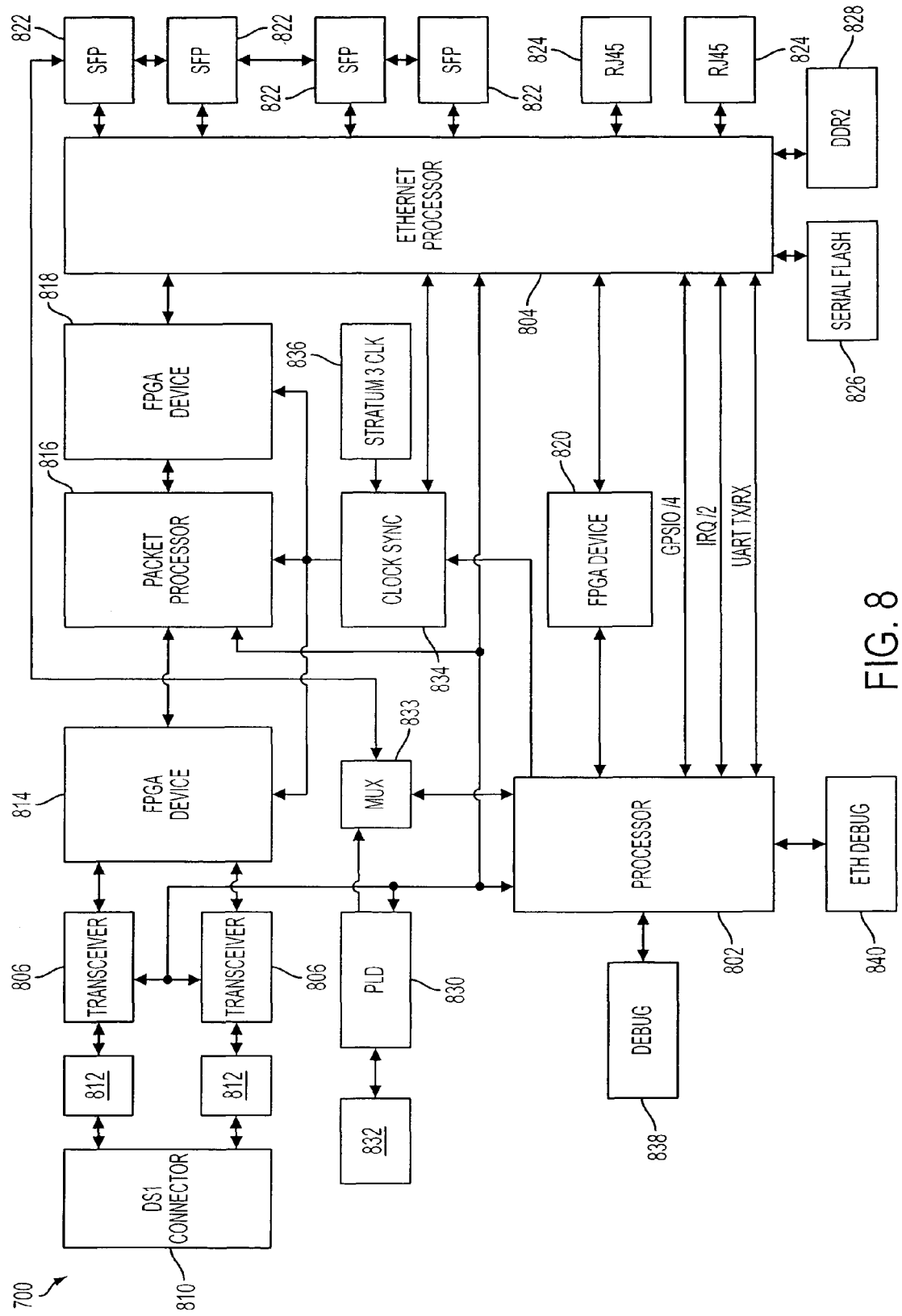
FIG. 8 is a block diagram of a multiservice access device in accordance with an illustrative embodiment of the present invention.

FIG. 8 illustrates a more detailed block diagram of a MAD 700 in accordance with an illustrative embodiment of the present invention. In the example of FIG. 8, a Field Programmable Gate Array (FPGA) provides a plurality of functions and interfaces to allow devices therein to communicate, thereby allowing high-level integration to reduce the physical footprint of the MAD 700. A processor 802 that provides the overall control of the MAD 700 is coupled to an Ethernet processor 804, at least one transceiver 806, and a programmable logic device (PLD) 830. Generally, the processor 802 receives status and control information from the various devices and transmits information over the bus to control the operation of the various devices. That is, the processor 802 generally does not receive network traffic to perform any switching. However, the processor 802 can receive some network information in order to perform diagnostic tests, provide information to a user on debug interfaces, and so forth. Further, as illustrated in FIG. 8, the processor 802 can be directly coupled to the Ethernet processor to control its operation (e.g., generate an interrupt, provide clock information, etc.).

In the example of FIG. 8, the transceivers 806 are configured to send and receive data via a conventional synchronous network such as DS1 via a DS1 connector 810. However, the transceivers 806 are coupled to the DS1 connector 810 via protection devices 812 that are configured to protect the MAD 700 from event failures as noted above. In one example, the protection devices 812 protect the transceivers from lightning events that generate high voltage/current for fractions of a second.

The transceivers 806 are also coupled to a FPGA device 814 that implements telecommunications diagnostics and loopback functions. For example, the FPGA device 814 implements in-band loopback functions that allow network diagnosis and other tools such as AIS-CI, RAI-CI, SPRM, NPRM, and so on. The FPGA device 814 therefore performs the functions of a plurality of NIUs which, as described in detail below, allow an operator of the MAD 700 to configure and troubleshoot the associated network connections in a more time efficient manner.

The FPGA device 814 is coupled to a Structure Agnostic Time Division Multiplexing over Packet (SAToP) processor 816, which receives and converts the network data (i.e., synchronous TDM data from transceivers 806) into packetized Ethernet packets for an asynchronous network. The packet processor 816 is agnostic with regard to the structure of the input and can, for example, receive a framed or unframed data input. The packet processor 816 outputs the TDM over packet (TDMoP) traffic (i.e., data) via a bus interface. The Ethernet processor 804 in conjunction with the processor 802 assigns high priorities, as well as other parameters, to the packetized TDM signals to help ensure that they are transported in accordance with Carrier Grade criteria so that telco standards can be met. The MAD 700 includes a high capacity Ethernet processor (e.g., 14 Gb throughput in terms of the MAD 700 shown in FIG. 1) to help avoid contention between the Structure Agnostic Time Division Multiplexing Packets and other Ethernet signals. In the example of FIG. 8, the packet processor 816 outputs the TDM over packet (TDMoP) traffic (i.e., data) on a Fast Ethernet (FE)/media independent interface (MII) bus that is received via FPGA device 818. Generally the MII connects different types of physical transceivers to Media Access Controllers (MAC) to thereby allow any MAC to be used with any transceiver regardless of the network signal transmission media (e.g., twisted pair, etc.).

However, the Ethernet processor 804 can use different bus interfaces than the packet processor 816. For example, as noted above, the packet processor 816 transmits and receives TDMoP traffic over a FE/MII bus, and the Ethernet processor 804 transmits and receives the network traffic over a Serial Gigabit MII (SGMII) bus. Accordingly, in the example of FIG. 8, the MAD 700 includes the FPGA device 818 to convert the MII bus data into second bus data format such as the SGMII bus associated with the Ethernet processor 804. Accordingly, the FPGA device 820 converts bidirectional traffic to and from the packet processor 816 and the Ethernet processor 804.

That is, synchronous DS1 traffic is received by a FPGA device 814 for diagnostic purposes, converted from the TDM synchronous format into asynchronous packets on a first bus interface, converted from the first bus interface into a second bus interface, and provided to the Ethernet processor 804 for suitable routing. Similarly, for data being transmitted from the Ethernet processor 804 via DS1, a corresponding process occurs to output the data via one of the transceivers 806. The FPGA device 814 also generates telecom diagnostic information to allow efficient troubleshooting of the network. The telecom diagnostic information is packetized and transmitted via Ethernet, thereby allowing a network operator to more efficiently troubleshoot any network errors associated with the synchronous network.

The Ethernet processor 804 is configured to perform the core switching, but, as described above, the processor 802 manages the operation of the devices in the MAD 700. Accordingly, the Ethernet processor 804 transmits and receives control information to allow the processor 802 to manage its operation. In the example of FIG. 8, the Ethernet processor 804 transmits and receives the management (MGMT) traffic over a SGMII bus. However, the processor 802 transmits and receives MGMT traffic over a MII bus and the Ethernet processor 804. Accordingly, in the example of FIG. 8, the MAD 700 includes a FPGA device 820 that converts the MII bus data into second bus data format such as a SGMII bus. Accordingly, the FPGA device 820 converts bidirectional traffic to and from the processor 802 and the Ethernet processor 804.

The Ethernet processor 804 is configured to communicate via a plurality of network interfaces. In the example of FIG. 8, the Ethernet processor communicates with four SFP ports 822 for fiber optic networking (e.g., a pair 26 and 28 for 1 GB subscriber drops and a second pair 22 and 24 for 1/2.5 GB network connections as described with reference to FIG. 1) and a pair of RJ45 for GigE subscriber drops (e.g., ports 30 and 32 in FIG. 1). Accordingly, to accommodate such bandwidth, the Ethernet processor 804 is configured to have substantially higher switching speed than the sum of the four network ports 22, 24, 26 and 28 described above. Further, as described in detail below, the Ethernet processor 804 can be configured in either daisy-chain configuration or can be configured in a ring topology. In the example of FIG. 8, the Ethernet processor 804 can accommodate 14 Gb of core switching. Because the Ethernet processor's switching capability (e.g., 14 Gb) exceeds the sum of the network connections drop provided to the subscriber (e.g., 4 Gb), the Ethernet is generally not running at maximum capacity, thereby allowing the Ethernet processor to avoid contention between Ethernet signals, operate at a low temperature and be positioned for later migration to additional ports in subsequent implementations of the multiservice access device in accordance with illustrative embodiments of the present invention. The Ethernet processor 804 is also coupled to a non-volatile memory device such as a Serial Flash memory 826 and a volatile memory such as DDR2 828 for temporary storage (e.g, low priority packets, etc.).

The processor 802 is further coupled to a programmable logic device (PLD) 830, which is further coupled to output indicators 832 (e.g., LEDs, matrix displays, etc.). The PLD 832 is coupled to multiplexer (MUX) 833, which is further coupled to the plurality of SFP ports 822 via a bidirectional interface (e.g., I2C, etc.). The PLD 830 receives information regarding the status of the ports and provides fixed logic functionality regarding the status of the SFP ports 822. For instance, the PLD 830 determines if a cable (e.g., available from Pulse Communications Inc.) is used in the SFP ports 822 and, if so, can determine if the cable plugged into the SFP 822 is properly terminated at the receiving device. Accordingly, the PLD 830 cause the output indicators 832 to provide a visual display to indicate that the network connection is properly terminated at the receiving device.

The processor 802 is also coupled to a Clock Sync device 834, which is also coupled to the Ethernet processor 804. The Clock Sync device receives clock instructions from the processor 802, and exchanges clock information with Ethernet processor 804. In particular, the Ethernet processor 804 is configured to provide a precision time protocol such as IEEE 1588 or Synchronized Ethernet (SynchE), and processor 802 provides instructions as well as exchanges information from other devices in the switch 700 (e.g., FPGA 814, packet processor 816, etc.) regarding the status of the synchronization of the devices in the switch 700. Synchronization from the Ethernet processor 804 is also shared with these devices. The synchronization operating mode is by initial default or provisioned by the telco or user, for example, and that mode is provided to the Clock Sync 834 as well as the Ethernet Processor 804 to determine the source of clocking, which in turn is provided to FPGA device 814, packet processor 816, and FPGA device 818. The Clock Sync device 834 can also receive a clock source from a Stratum 3 clock 836 or from the incoming DS1 or DS3 signals as an alternative to IEEE 1588 or Synchronized Ethernet (SynchE) synchronization. In the event the devices in the MAD 700 are unsynchronized, the operation of the DS1 or DS3 network would not function correctly, if at all. Thus, the Clock Sync device 834 may use several different, alternative clocking sources for synchronization.

Thus, the MAD 700 in accordance with an illustrative embodiment of the present invention is particularly advantageous for telcos that provide SONET and Ethernet services. Synchronized networks such as SONET have precise timing, whereas Ethernet networks may have no such timing requirements. Standards and techniques for transporting standard DS1 and/or DS3 signals over an Ethernet network instead of a traditional Time Division Multiplexing (TDM) network are known. In general, a synchronous DS1 signal is "packetized" for Ethernet compatibility and various means are utilized to "reassemble" the packets into a conventional and properly timed DS1 or DS3. Improvements to minimize delay, jitter and synchronization differences, however, are needed. The MAD 700 constructed in accordance with an illustrative embodiment of the present invention has configurable synchronization options to address these issues.

Accordingly, to support telcos that provide both SONET and Ethernet services, the MAD 700 employs SynchE, IEEE 1588, synchronization to incoming DS1/DS3 signals and Stratum 3 synchronization capabilities, as well as Adaptive Clock Recovery (ACR). For example, a user or telco can select one of SynchE or IEEE 1588 via provisioning. If the telco or user equipment does not support either SynchE or IEEE 1588, the user or telco can select one of synchronization to incoming DS1/DS3 signals or Stratum 3 synchronization (e.g., via provisioning or default configuration); otherwise, ACR can be used. The MAD 700 employs ITU G.824 (e.g., the control of jitter and wander within digital networks which are based on the 1544 kbit/s hierarchy), ITU G.8261 (e.g., timing and synchronization aspects in packet networks), Network Timing Protocol Version 4 (NTPv4) to convey timekeeping information from primary servers, as well as IEEE 1588v2 (e.g., IEEE Standard for a Precision Clock Synchronization Protocol for Networked Measurement and Control Systems; Precision Timing Protocol (PTP) with one or two step clock), SynchE ITU G.8262 (e.g., timing characteristics of synchronous Ethernet Equipment slave Clock (EEC)), and SynchE ITU G.8264 (e.g., distribution of timing information through packet networks).

It is noted that 4G cellular applications require very precise timing, and certain implementations of IEEE 1588 and SynchE may result in interaction that may preclude use in 4G networks because of small synchronization instabilities. The configurable synchronization of the MAD 700 described above in accordance with an illustrative embodiment of the present invention avoids such detrimental interaction so that use with 4G networks is possible.

The MAD 700 also includes a first debug interface 838 for configuring the synchronous network and a second debug interface 840 for configuring the asynchronous network. The first debug interface 838 may be a standard D-subminiature 9 (i.e., DB9) connector to control and configure the FPGA device 814 integral NIU functionality that corresponds to that of conventional NIUs and other parameters related to the synchronous network. Conventional NIUs are individual cards (e.g., implemented in Type 400 mechanics) that require an operator to plug into each individual NIU and configure it manually, even if the configuration between NIUs is identical. By contrast, an advantage is realized by an illustrative embodiment of the present invention, wherein there are multiple, integral NIUs implemented in the FPGA device 814, and the debug interface 838 allows an administrator to configure one or many of the NIUs at the same time. Thus, the administrator can quickly and efficiently configure the NIUs in the MAD 700. Further, because NIUs can be configured at the same time, this prevents minor clerical errors by the administrator. Further, as stated above, the form factor of the MAD 700 is reduced by having integral NIUs versus having to use plural, external cards or other devices.

The second debug interface 840 is implemented using conventional port (e.g., RJ45, USB, etc.) and is used to configure the network configuration with respect to the asynchronous network. As illustrated above, the administrator can configure the arrangement of the network connections. For example, as illustrated in FIG. 3, two MADs 700 can be configured to provide 8 Gb of data from combined gigabit Ethernet and DS1/DS3 signals. Further, as illustrated in FIG. 5, MADs 700 can be implemented in a ring configuration via the second debug interface 840 or, in some cases using LACP, the MAD 700 can configure themselves automatically.

Thus, the one or two MAD 700 can be configured to support the following speeds and capacity: 14 Gb Wirespeed Switching Core Speed, 8 Full Rate GigEs+24 DS1s (e.g., for Subscriber Locking Wall Mount Enclosure capacity and rack mounted shelf capacity), latency of 2.8 μsec+frame, Jumbo Frame support, a payload of 32 Full Rate GigE circuits plus 96 DS1s per fiber pair with CWDM optics, and CO capacity (in bookend configuration) of 160 Full Rate GigEs plus 480 DS1s in a standard 7 Ft. rack assembly.

The MAD 700 constructed in accordance with an illustrative embodiment of the present invention has a surge-protected 24 VDC to 48 VDC input voltage range. External adapters are available for local 120VAC powering and remote powering. Thus, the MAD 700 can be powered via a wide array of redundant or non-redundant powering options such as 48Vdc, cell-site 24Vdc, 120Vac via an optional (e.g., the 2100-0300 power converter available from Pulse Communications Inc.) or remote powering over up to 4 miles of 22 Ga copper pairs via optional Span Power units (e.g., also available from Pulse Communications Inc.).

The MAD 700 supports Layer 2 Carrier Ethernet such as 802.1 Q-in-Q (formerly known as 802.1ad), 802.1D MAC Bridging and Auto Learning, 802.1Q VLAN (e.g., 8K MAC; 4K VLAN; STP, RSTP and MSTP), Hierarchical MEF compliant policing and scheduling, MEF 6, 9, 10, 14 and 18, and VLAN Translation, MAC-based VLAN and Protocol-based VLAN.

The MAD 700 supports Class of Service (CoS)/Quality of Service (QoS) such as Committed and Excess Information Rate (CIR/EIR) granularity of 64 k, CoS per port (e.g., VLAN ID (C-tag), VLAN P-bits, MAC, DSCP), eight CoS queues per port and eight 802.1p priorities, Multicast, Broadcast and Unicast Storm Control, RFC2698 Two Rate 3 Color Marker (tr3CM) for ingress policing, Policing by port, service, bandwidth and queue, and Strict or deficit weighted round robin scheduling.

Protocols used by the MAD include, but are not limited to, SAToP (Structure-Agnostic TDM over Packet), ITU-T Y.1453: TDM-IP interworking-User plane interworking, RFC 4553: Structure-Agnostic Time Division Multiplexing (TDM) over Packet (SAToP), MEF18: Test Suite for Circuit Emulation Services over Ethernet based on MEF 8: Implementation Agreement for the Emulation of PDH Circuits over Metro Ethernet Networks, RFC 4385: Pseudowire Emulation Edge-to-Edge (PWE3) Control Word for Use over an MPLS PSN, ANSI T1.403: Network and Customer Installation Interfaces-DS1 Electrical Interface, ANIS T1.231.02-2003 (R2007): DS1-Layer 1 In-Service Digital Transmission Performance Monitoring, and REACT test system.

With regard to protection switching, the MAD 700 is configured to support IEEE 802.1ad Link Aggregation Control Protocol (LACP), IEEE 802.1AX (prior 802.3ad) Standard for Local and metropolitan area networks—Link Aggregation, Static Link Aggregation support for legacy network applications, ITU-T G.8031/Y.1342: Ethernet linear protection switching, G.8032/Y.1344: Ethernet ring protection switching, Protection switching under 50 ms, and 1+1, 1:1, 1:N and Provider Backbone Ethernet Virtual Connection (PB-EVC) E-line protection.

With regard to management, the MAD 700 supports IEEE 802.1AB: Station and Media Access Control Connectivity Discovery (Link Layer Discovery), IEEE 802.1ag: Connectivity Fault Management/Flow OAM, IEEE 802.3ah: Ethernet in the First Mile/Link OAM: monitoring, signaling, loopback, ITU-T Y.1731 OAM functions and mechanisms for Ethernet based networks ETH-APS (Ethernet Automatic Protection Switching), ITU-T Y.1731 OAM functions and mechanisms for Ethernet based networks ETH-RAPS (Ethernet Ring Automatic Protection Switching), ITU-T Y.1731 OAM functions and mechanisms for Ethernet based networks ETH-DM (Ethernet frame delay and frame delay variation measurement), SNMP v1/2/3, Command Line Interface (CLI), Telnet, and TIA 1057 Link Layer Discovery Protocol for Media Endpoint Devices (LLDP-MED).

Figure 9:
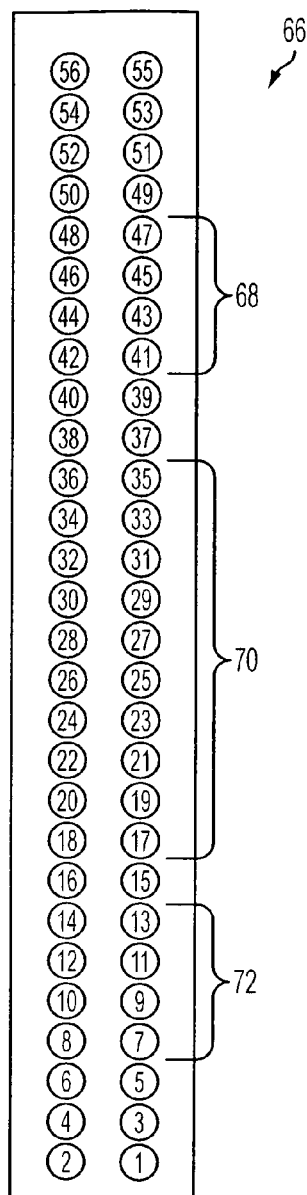
FIG. 9 is a front view of an edge connector of a multiservice access device in accordance with an illustrative embodiment of the present invention.

FIG. 9 depicts the card 10 edge connector 66 to a backplane (e.g., of a shelf or other mounting device or enclosure 40, 42). The edge connector 66 has DC contact closures (e.g., for legacy applications) to provide information to the card 10 and therefore user (e.g., via the LEDs) on the operation of DC contact closure alarms. For example, dry contacts at pins 47 and 41 (e.g., R1 and T1) are for a Link Down function on an enabled Ethernet port, LOF or LOS on an enabled T1, or Unit failure. Power supply connections indicated generally at 70 can be, for example, negative and positive supply inputs (e.g., at pins 35 and 17, respectively) and ground (e.g., chassis ground at pins 27 and 1). Dry contacts for Far End Fault Indication (FEFI) are also provided as indicated at 72 (e.g., at pins 13 and 7 for R and T). The pins 72 on the edge connector 66 provide FEFI or OAM Link down indicator on an enabled Ethernet port, and AIS or RAI on an enabled T1. Simultaneous T/R and T1/R1 contact closures indicate internal unit failure or loss of power. As stated above, the LEDs 14, 16 and 18 can show Ethernet, DS1 and UNIT status.

As described in connection with FIG. 1, the MAD 700 (e.g., card 10) is provided with a craft port (e.g., CRAFT port 20 which can be a RS232 DB9 craft port) and a management port (e.g., an RJ45 Ethernet Out of Band (OOB) Ethernet management or MGMT port 36). The CRAFT port 20 provides access for DS1 provisioning. For example, the Craft port 20 can provide access to a menu-driven DS1 Command Line Interface (CLI) for provisioning of DS1 parameters. The Craft port 20 can be accessed from a personal computer (PC), laptop, or other computing device using VT-100 emulation (e.g., a computing device running HyperTerminal or compatible VT-100 terminal emulation program connected to the CRAFT port 20 via an RS-232 standard communications cable). Although the CRAFT port 20 provides access to a full range of provisioning and monitoring capabilities associated with DS1 Structure-Agnostic Time Division Multiplexing (TDM) over Packet (SAToP), also called DS1 pseudowire, it is to be understood that most applications can be supported with default parameters for the MAD 700. The following table provides examples of default parameters for a MAD 700 in accordance with an illustrative embodiment of the present invention.

Multiservice Access Device (MAD) Provisioning

| Feature | Option and Description | Default |
|---|---|---|
| A. Unit Provisioning | | |
| Unit State | In service or out of service | In Service |
| Unit Type | Remote or CO: Remote is generally used when the MAD is at the subscriber site. CO is used when the MAD is located on the central office side of the circuit, even though the MAD may be physically installed in an RT cabinet and connected via fiber to a downstream MAD Series unit at a subscriber site. | Remote |
| B. DS1 Provisioning | | |
| Name | Permits assigning a 12-character name to each DS1 | DS1 #(1-12) |
| State | Disable, enable (in service) or maintenance (out of service) | Disabled |
| Framing Format | Superframe (SF), extended superframe (ESF), or unframed | ESF |
| Line Coding | Bipolar with 8-zero substitution (B8ZS) or alternate mark inversion (AMI) | B8ZS |
| Line Build Out | 0-133 ft., 134-266 ft., 267-399 ft., 400-533 ft., 534-655 ft. | 0 to 133 feet |
| DS1 Loopback | Enable or disable | Enable* |
| DS1 Loopback Timeout | 1, 2, 4, 8, 60 minutes, or No TimeOut | 60 minutes* |
| Response to DS1 Loss of Signal | Send AIS to network (i.e., toward the CO when the MAD is at the subscriber site) or initiate loopback NOTE: When AIS-CI is enabled and the MAD is provisioned as an RT unit, an AIS-CI will be sent toward the CO for a subscriber DS1 LOS. | Send AIS (or AIS-CI) to network |
| Loopdown on AIS | Yes or no | No* |
| AIS-CI Generation | Enable or disable | Enable* |
| RAI-CI Generation | Enable or disable | Enable* |
| NPRM Generation | Enable or disable | Enable* |
| SPRM Generation | Enable or disable | Enable* | ature functions only when units are provisioned as Remote; feature is not applicable to units provisioned as CO.
Note:
Changes to global DS1 settings can affect enabled circuits.

Provisioning can be accomplished using a DS1 Interface Configuration menu as indicated in the following table, for example.

DS1 Interface Configuration (per DS1)

| Parameter | Default | Configurable Values |
|---|---|---|
| Line Build Out | 0-133 ft | 0-133, 134-266, 267-399, 400-533, 534-655 Ft |
| T1 Loopback | Enable | Enable/Disable |
| T1 Loopback Timeout | 60 Min | 1, 2, 4, 8, 60 Min or Never |
| Response to T1 LOS | Send AIS to Network | Send AIS/Loopback toward network |
| Loop down on AIS | No | No/Yes |
| AIS-CI Generation | Enable | Enable/Disable |
| RAI-CI Generation | Enable | Enable/Disable |
| NPRM Generation | Enable | Enable/Disable |
| SPRM Generation | Enable | Enable/Disable |

DS1 performance parameters can be accumulated and stored over 15-minute and 1-day periods on a memory of the MAD 700 or other local or remote memory. Parameter history is available at 15-minute periods for the last 96 intervals and at 1-day periods for the last 7 days via the Performance Manager Menu. Current performance monitoring (PM) data can be reset, and PM history can be erased.

The Management Port (e.g., MGMT port 36 on the faceplate 12) provides access to a Graphical User Interface (GUI) and permits provisioning of Ethernet parameters, among other parameters such as: System configuration parameters, Port configuration parameters upon viewing link status, Security parameters, Network parameters, Aggregation parameters (e.g., static parameters such as Hash code contributors and group assignments, and LACP settings per port), Link OAM parameters (e.g., Port settings such as OAM Enable/disable, OAM Mode Passive/Active, Loopback Support Enable/disable, Link Monitor Support Enable/disable, MIB Retrieval Support Enable/disable, Loopback Operation Enable/disable, and Event settings such as (per port) window and period threshold for Error Frame Event, Event Seconds Summary, Symbol Period Error Event, and Frame Period Error Event), LLDP parameters, Synch E parameters, Alarm parameters (e.g., Ethernet Ring Protection Switching (ERPS) settings, MAC settings, VLAN settings, QoS settings), and Monitoring parameters).

Figure 10:
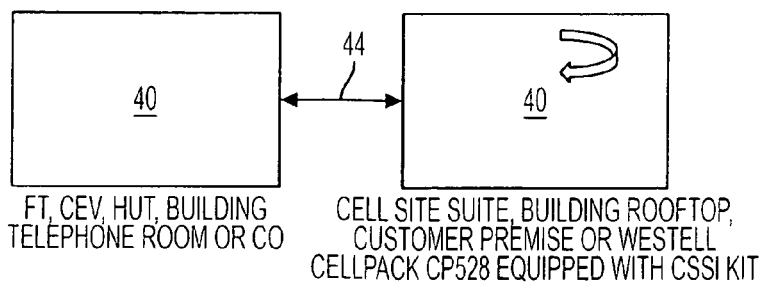
FIG. 10 is a block diagram of a multiservice access device with remote loopback in accordance with an illustrative embodiment of the present invention.

FIG. 10 illustrates DS1 remote loopbacks implemented at a site 42 using a MAD 700 (e.g., card 10) constructed in accordance with an illustrative embodiment of the present invention. The MAD 700 in the mounting device at site 42 can recognize in-band and ESF data link loopback codes.

To respond to DS1 loopbacks, the MAD 700 (e.g., card 10) is provisioned as a Remote (CPE-side) unit (default), has its loopbacks enabled (default), and is provisioned for either ESF (default) or SF operation. When provisioned for ESF operation, the MAD 700 will respond to either in-band or ESF data link (out-of-band) loopback codes; when provisioned for SF operation, the multiservice access device will only respond to in-band loopback codes.

During a loopback, an alarm indication signal is sent to the DS1 Tip1/Ring1 (receive) pair. If the multiservice access device is provisioned for "Loopdown on AIS=YES" and the multiservice access device receives (from the network link) an AIS signal in the DS1 circuit being looped back, the MAD loopback will be deactivated.

If provisioned as a CO-side unit, the MAD automatically disables all remote loopback detection. Loopbacks can be enabled on any or all DS1s in a unit provisioned as Remote via a CRAFT port loopback enable screen. Manual loopbacks are available on both the CO and Remote units via the DS1 configuration screens.

Three types of T1 manual loopback are available for use via the CRAFT port 20. These loopbacks can be accessed via the Maintenance Manager Menu: (1) Network (toward network interface); (2) Customer (toward DS1 drop interface); and (3) Bilateral (toward network and DS1 drop interfaces).

The following table provides illustrative loopback requests.

| A. SF Configuration | |
| --- | --- |
| In-Band Loopback Code | Binary |
| Activate (Network) | 11000 (2 in 5) |
| Deactivate (Network) | 11100 (3 in 5) |
| AIS (Deactivate)* | All Ones |

| B. ESF Configuration | |
| --- | --- |
| In-Band Loopback Code | Binary |
| Activate (Network) | 11000 (2 in 5) |
| Deactivate (Network) | 11100 (3 in 5) |
| AIS (Deactivate)* | All Ones |
| ESF Data Link Loopback Code | Binary |
| Activate (Line) | 00001110 11111111 |
| Deactivate (Line) | 00111000 11111111 |
| Universal Deactivate | 00100100 11111111 |
| AIS (Deactivate)* | All Ones |

*When unit is provisioned for "Loopdown on AIS = YES"

As described above, the MAD 700 has a reduced form factor (e.g., convenient plug-in card or module for use in many existing T1 NIU shelves or other cell site and business telecommunications equipment mountings) that can provide the desired integrated diagnostics. Although the multiservice access device or MAD 700 is miniaturized (e.g., as a card 10) so that it can fit on the referenced standard mechanics of telcos, other similar versions of the multiservice access device can be optimized for use in relatively small outdoor boxes for deployment on exterior telco-customer building wails in accordance with different illustrative embodiments of the present invention. For example, the MAD 700 can be deployed in a Network Interface Device (ND) comprising a small enclosure having a separate, lockable interior space for electronics, and an accessible extension with DS1 RJ48C. jacks, to provide a demarcation point between a carrier's local loop and customer premises wiring. Regardless of the form factor, the multiservice access device 700 can be purpose-built for Harsh Environments (e.g., GR-3108-CORE Class 3 including 40° C. to +70° C. operation) in accordance with an illustrative embodiment of the present invention.

Figure 12A:
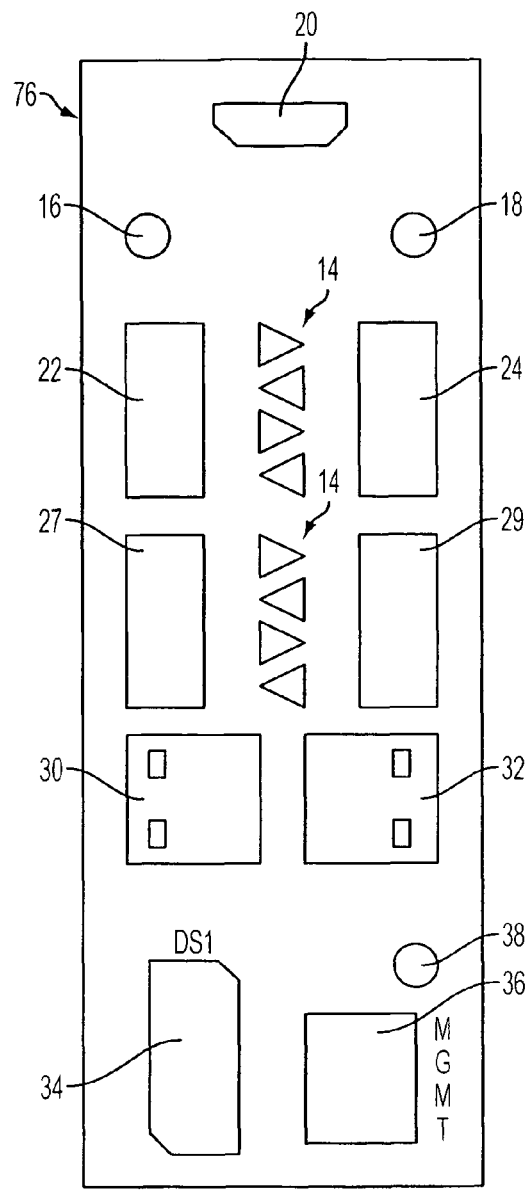
FIGS. 12A and 12B depict, respectively, a front view of a face plate of a multiservice access device configured to map pseudowire DS1s into are OC3 and corresponding example network configuration, in accordance with an illustrative embodiment of the present invention.
Figure 12B:
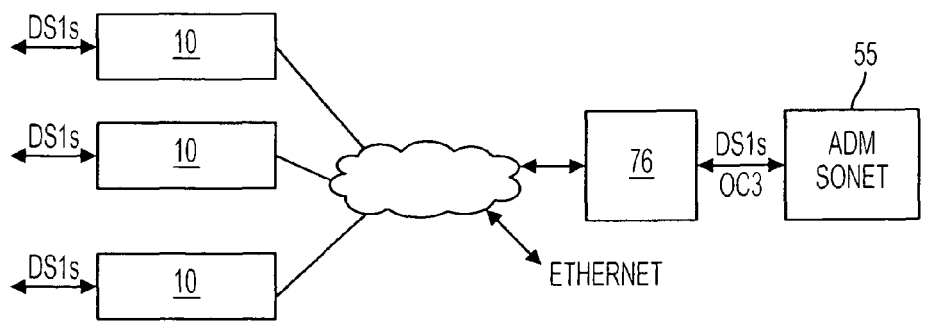
Figure 13A:
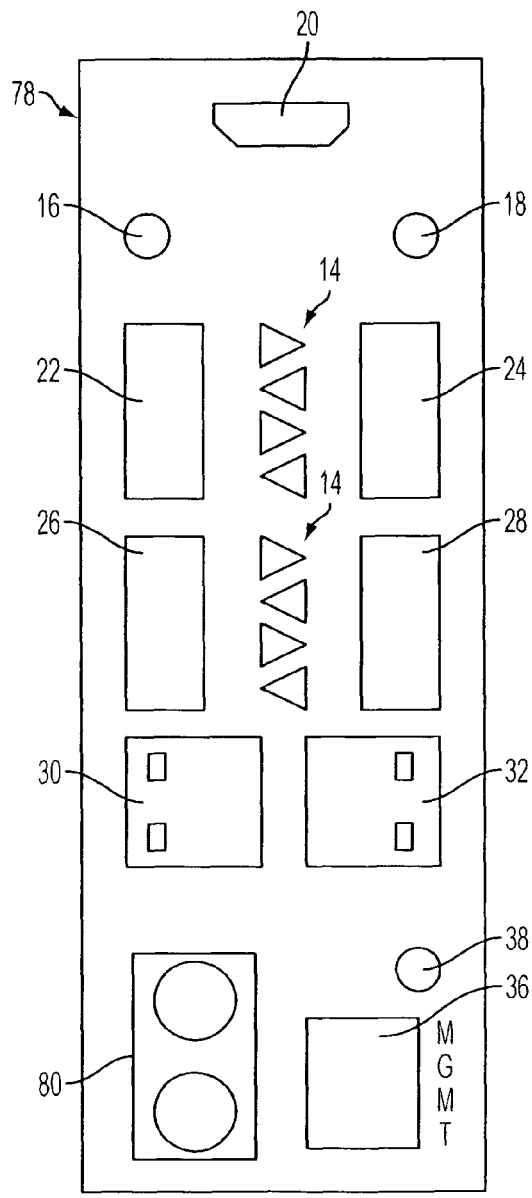
FIGS. 13A and 13B depict, respectively, a front view of a face plate of a multiservice access device configured for DS3 to DS3 mapping, and corresponding example network configuration, in accordance with an illustrative embodiment of the present invention.
Figure 13B:
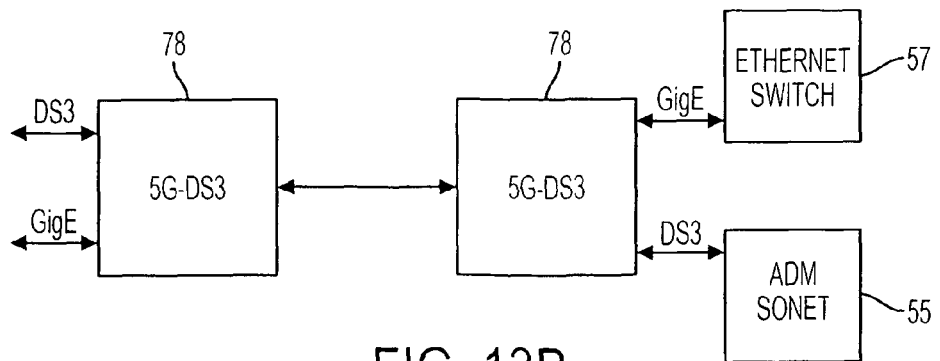
Figure 14:
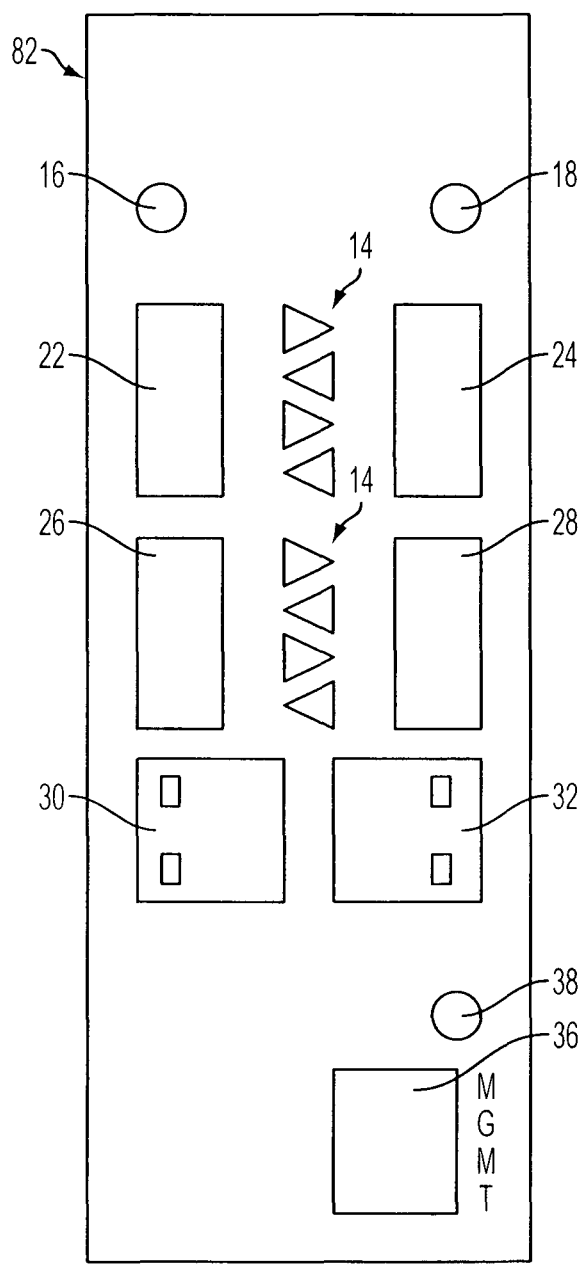
FIG. 14 depicts a front view of a face plate of a multiservice access device configured for Ethernet access, in accordance with an illustrative embodiment of the present invention.

FIGS. 12A, 13A and 14 provide additional examples of a MAD 700 in accordance with illustrative embodiments of the present invention. With reference to FIGS. 12A and 12B, a MAD 700 configured as a card, enclosure or other form factor device 76 can map, for example, as many as 84 pseudowire DS1 s (e.g., from cards 10) into an OC3 connected to an ADM SONET). With reference to FIGS. 13A and 13B, a MAD 700 configured as a card, enclosure or other form factor device 78 can provide similar Ethernet capabilities as described above in connection with the card 10, for example, but without DS1s to address shifting a network to Ethernet. For example, the device 78 can address 20,000 O3D3 TDM units available from Pulse Communications Inc. A DS3 port 80 is provided in lieu of a DS1 connector 34. While only 1 DS3 is shown, additional DS3s can be accommodated in place of one or more Ethernet drops 26, 28, 30 and 32. The MAD 700 shown in FIG. 14 is a card, enclosure or other form factor device 82 having no DS1 or DS3 ports, and operates as a somewhat depopulated MAD 700 in the sense that it provides Ethernet access while eliminating DS1 pseudowire (PSE) costs.

As stated above and in accordance with illustrative embodiments of the present invention, the MAD 700 comprises at least two 2.5 Gb/1 Gb Ports (e.g., single fiber, dual fiber and/or CWDM). The MAD 700 can also have at least four full rate GigE subscriber ports (e.g., two SFP GigE and two RJ45 10/100/1000BT ports, all with Jumbo Frame support and wirespeed switching core). The MAD 700 provides complementary RJ48C demarc, connectorized and stub ended DS1 cable options. The MAD 700 operates in accordance with a plug-and-play universal mode with 1-to-1 Ethernet and DS1 port mapping end-to-end. The MAD 700 implements at least twelve, integral, full featured T1 NIUs (e.g., inband loopback, GR-1089-CORE 3a/b and 5a/b lightning protection, NPRM, SPRM, AIS/AIS-CI and RAI/RAI-CI). The MAD 700 has an Ethernet processor or other circuit or module with SynchE, IEEE 1588 synchronization built in, as well as Stratum 3 and incoming DS1/DS3 synchronization capabilities. The MAD 700 provides 50 ms Protection Switching (e.g., built in ITU G.8032 ERPS and IEEE 802.1AX link aggregation), OAM (e.g., IEEE 802.1ab, 802.1ag, 802.3ah, ITU-T Y.1731), and is configured to withstand harsh environments (e.g., complies with GR-3108-CORE Class 3 including −40° C. to +70° C. operation in existing or new CP528 OSP demarc enclosures). The MAD 700 can implement micro-ring and daisy-chain topologies (e.g., with single fiber delivery of dozens of DS1 ports and dozens of GigE ports) and therefore facilitate expansion and resiliency, simple growth, and low first costs. The multiservice access device can be powered via 24/48Vdc, as well as having remote powering and local 120Vac powering capability.

In addition to comprehensive Layer 2 Ethernet and DS1 capabilities, the miniaturized or reduced form factor MAD 700 in accordance with illustrative embodiments of the present invention has unique installation capabilities to address the real-world challenges faced when deploying Ethernet-over-fiber such as: cabinets, relay racks, power, demarc relocation, fiber starvation, resiliency; growth, turn-up time, existing infrastructure, troubleshooting, training, DS1 transitions, site preparation, planning, engineering, harsh environments, lightning, and temperature extremes.

Thus, in terms of impact, it takes only about 30 seconds to plug an MAD 700 (e.g., the simple all-in-one Ethernet and DS1 access card 10 shown in FIG. 1) constructed in accordance with an illustrative embodiment of the present invention into many existing T1 NIU shelves, either side-by-side or instead of existing copper-based T1/HDSL plug-ins or other cards (e.g., O3-4D1, O3-12D1 or O3D3 units available from Pulse Communications Inc.). Expansion is just as fast. The side-by-side card 10 is plug compatible with other 400-mechanics TDM, Ethernet-over-SONET and Native-Ethernet plug-ins (e.g., available from Pulse Communications Inc.) to meet virtually any combination of legacy and emerging service needs, even Program Channel High Fidelity Broadcast Audio links.

Illustrative embodiments of the present invention have been described with reference to a card or other form factor with FPGA, circuit board or other module programmable or configured to provide at least the functions described herein. It is to be understood, however, that the present invention can also be arranged in other configurations construed as within the scope of the invention by those persons skilled in the art to which the present invention pertains.

While the invention herein disclosed has been described by means of specific embodiments and applications thereof, numerous modifications and variations can be made thereto by those skilled in the art without departing from the scope of the invention.

What is claimed is:

1. A multiservice access device, comprising:
    a synchronous network receiver for receiving synchronous network traffic;
    a plurality of network interface debuggers integral to the multiservice access device for generating messages related to the status of the synchronous network;
    a packet processor for processing the synchronous network traffic and messages into packetized synchronous network data for asynchronous transmission over an Ethernet network in a first bus format;
    a first bus translator for translating the first bus format into a second bus format;
    an Ethernet processor for receiving the packetized synchronous network data in the second bus format and asynchronously transmitting the packetized synchronous network data over Ethernet;
    a clock synchronizing device for receiving clock information from a plurality of devices and status information from the synchronous network receiver, the network interface debuggers, and the packet processor and determining a clock, and providing the clock to the synchronous network receiver, the network interface debuggers, and the packet processor; and
    a processor for managing the operation of the transceiver, the packet processor, and the Ethernet processor, wherein the processor sends and receives control information from the Ethernet processor on a third bus interface.

2. A multiservice access device as described in claim 1, further comprising a second bus translator for translating the control information from a third bus interface associated with the processor into a fourth bus interface, wherein the processor sends and receives the control information via the third bus interface and the Ethernet processor sends and receives the control information via the fourth bus interface.

3. A multiservice access device as described in claim 2, wherein the first bus translator, second bus translator, and the network interface debuggers are integral to a single functional programmable logic device.

4. A multiservice access device as described in claim 1, wherein the processor assigns high priority to the packetized synchronous network data for carrying the packetized synchronous traffic asynchronously over Ethernet according to carrier grade requirements for synchronous data.

5. A multiservice access device as described in claim 1, wherein the clock information is received from an operator of the multiservice access device, the synchronous network traffic, and a third clock source integral to the multiservice access device.

6. A multiservice access device as described in claim 5, wherein the clock information is received from at least one of an operator comprises at least one of synchronized Ethernet (SyncE) or IEEE-1588 clock information.

7. A multiservice access device as described in claim 1, wherein an administrator may configure the plurality of network interface debuggers via a single interface exposed on a facility-side surface of the multiservice access device.

8. A multiservice access device as described in claim 1, wherein a maximum switching core speed of the Ethernet processor is at least two times greater than a maximum switching speed of the multiservice access device.

9. A multiservice access device as described in claim 1, wherein the synchronous network receiver is coupled to the synchronous network via a line input protection device for protection from environmental hazards.

10. A multiservice access device as described in claim 1, wherein the Ethernet processor receives Ethernet traffic via one of an electrical interface and an optical interface and transmits the Ethernet traffic concurrent with the packetized synchronous network data.

11. A multiservice access device as described in claim 1, wherein the synchronous network comprises at least one of a DS1 and a DS3 network.

12. A multiservice access device comprising:
    at least one facility side optical Ethernet port configured for at least 1 Gigabit (Gb) bandwidth operation;
    at least one drop side optical Ethernet port configured for at least 1 Gigabit (Gb) bandwidth operation;
    at least one DS1/DS3 port comprising one of a DS1 drop port and a DS3 drop port;
    a synchronous data processing device configured to receive synchronous data traffic from the DS1/DS3 port, perform telecommunications diagnostics and loopback functions with respect to at least one of time division multiplexing (TDM) DS1 and DS3 circuits corresponding to synchronous data traffic to provide network interface unit (NIU) operations integrally to the multiservice access device, and convert the synchronous data traffic into packetized signals for Ethernet transmission; and
    a processing device configured to receive asynchronous data traffic from the at least one facility side optical Ethernet port and the at least one drop side optical Ethernet port and to receive the packetized signals from the synchronous data processing device, and to switch the packetized signals and the asynchronous data traffic to a selected one of the at least one facility side optical Ethernet port and the at least one drop side optical Ethernet port for Ethernet transport;
    wherein the telecommunications diagnostics comprises at least one of Network Performance Report Messages (NPRM), Supplemental Performance Report Messages (SPRM), Alarm Indication Signal (AIS), Remote Alarm Indication (RAI), Alarm Indication Signal-Customer Interface (AIS-CI) and Remote Alarm Indication-Customer Interface (RAI-CI).

13. A multiservice access device as claimed in claim 12, wherein the multiservice access device is implemented in one of a plug-in card or a small enclosure.

14. A multiservice access device as claimed in claim 13, wherein the plug-in card is configured in accordance with at least one of Industry Standard T1 NIU mechanics, Type 400 network channel terminating equipment (NCTE) mechanics, and Smart Jack mechanics.

15. A multiservice access device as claimed in claim 13, wherein the synchronous data processing device is configured to provide telecommunications diagnostics and loopback functions corresponding to each of a plurality of network interface units (NIUs) integrally with respect to the plug-in card or small enclosure.

16. A multiservice access device as claimed in claim 15, wherein the plug-in card or small enclosure comprises a user interface to allow a user to configure the functions of respective ones of the plurality of NIUs.

17. A multiservice access device as claimed in claim 13, wherein the plug-in card or small enclosure comprises a lightning protection device coupled to the at least one DS1/DS3 port.

18. A multiservice access device as claimed in claim 12, wherein the processing device performs at least one of SynchE and IEEE 1588 synchronization, and at least one of synchronization to incoming DS1/DS3 signals, Stratum 3 synchronization, and Adaptive Clock Recovery, and is configurable to use a selected one of SynchE synchronization, IEEE 1588 synchronization, synchronization to incoming DS1 or DS3 signals at the at least one DS1/DS3 port, Stratum 3 synchronization, and Adaptive Clock Recovery.

19. A multiservice access device as claimed in claim 18, wherein if telco or user equipment connected to the multiservice access device does not support either SynchE or IEEE 1588 synchronization, then one of synchronization to incoming DS1 or DS3 signals or Stratum 3 synchronization or Adaptive Clock Recovery is selected via at least one of provisioning, user input, and default configuration of the multiservice access device.

20. A multiservice access device as claimed in claim 12, wherein the at least one facility side optical Ethernet port comprises at least two Ethernet ports, and the processing device is configured to manage switch-to-protection with respect to the at least two Ethernet ports.

21. A multiservice access device as claimed in claim 20, wherein the processing device is configured to communication with other multiservice access devices to operate in accordance with at least one of a daisy-chain topology and micro-ring topology.

\* \* \* \* \*